(12) United States Patent
Chan et al.

(10) Patent No.: US 8,725,800 B1
(45) Date of Patent: May 13, 2014

(54) MOBILE PHOTO APPLICATION MIGRATION TO CLOUD COMPUTING PLATFORM

(71) Applicant: Nextbit Systems Inc., San Francisco, CA (US)

(72) Inventors: Michael A. Chan, San Francisco, CA (US); Tom Moss, Los Altos, CA (US); Daniel R. Bornstein, San Francisco, CA (US); Michael K. Fleming, San Francisco, CA (US); Justin Quan, San Francisco, CA (US); Linda Tong, San Francisco, CA (US)

(73) Assignee: Nextbit Systems Inc., San Francisco, CA (US)

( * ) Notice: Subject to any disclaimer, the term of this patent is extended or adjusted under 35 U.S.C. 154(b) by 0 days.

(21) Appl. No.: 14/160,351

(22) Filed: Jan. 21, 2014

Related U.S. Application Data (63) Continuation-in-part of application No. 14/043,126, filed on Oct. 1, 2013.

(60) Provisional application No. 61/708,794, filed on Oct. 2, 2012.

(51) Int. Cl.
*G06F 15/16* (2006.01)
*G06F 9/46* (2006.01)
*H04M 3/42* (2006.01)

(52) U.S. Cl.
USPC .................. 709/203; 718/100; 455/414.1

(58) Field of Classification Search
None
See application file for complete search history.

(56) References Cited

U.S. PATENT DOCUMENTS

| | | | |
|---|---|---|---|
| 7,016,909 B2 * | 3/2006 | Chan et al. | 1/1 |
| 2011/0072090 A1 * | 3/2011 | Deluca et al. | 709/206 |
| 2012/0066373 A1 | 3/2012 | Ochoa et al. | |
| 2012/0089704 A1 | 4/2012 | Trahan et al. | |
| 2012/0089726 A1 | 4/2012 | Doddavula | |
| 2013/0157626 A1 * | 6/2013 | Talwar et al. | 455/413 |
| 2013/0157699 A1 * | 6/2013 | Talwar et al. | 455/466 |
| 2014/0006973 A1 * | 1/2014 | Cattermole et al. | 715/753 |

OTHER PUBLICATIONS

Co-Pending U.S. Appl. No. 14/043,126 by Chan, M.A. et al., filed Oct. 1, 2013.
Co-Pending U.S. Appl. No. 14/157,260 by Chan, M.A. et al., filed Jan. 16, 2014.
Co-Pending U.S. Appl. No. 14/159,934 by Chan, M.A. et al., filed Jan. 21, 2014.
International Search Report and Written Opinion mailed Jan. 2, 2014, 7 pages, for International Application No. PCT/US2013/062995 filed Oct. 2, 2013.

* cited by examiner

*Primary Examiner* — Ranodhi Serrao
(74) *Attorney, Agent, or Firm* — Perkins Coie LLP (57) ABSTRACT

Technology is disclosed herein for migrating execution of at least a portion of a photo application to a server. According to at least one embodiment, a computing device monitors the photo application executing at the mobile device to identify a background thread and a foreground thread of the photo application, determine a current workload of the mobile device, transmit a received photo and an instance of the background thread to the server when the determined current workload exceeds a predefined threshold, receive a processed photo from the server, and provide access to the processed photo through the mobile device using the user interface generated by the foreground thread of the photo application.

25 Claims, 9 Drawing Sheets

MOBILE PHOTO APPLICATION MIGRATION TO CLOUD COMPUTING PLATFORM

PRIORITY CLAIM

This application is a continuation-in-part of U.S. patent application Ser. No. 14/043,126, filed on Oct. 1, 2013, entitled "MOBILE APPLICATION MIGRATION TO CLOUD COMPUTING PLATFORM", which claims the benefit of U.S. Provisional Patent Application No. 61/708,794, filed on Oct. 2, 2012, entitled "CLOUD COMPUTING INTEGRATED OPERATING SYSTEM", which are incorporated by reference herein in their entirety.

FIELD OF THE INVENTION

At least one embodiment of the present invention pertains to mobile devices, and more particularly, to mobile devices capable of migrating service components of mobile applications to cloud computing platform.

BACKGROUND

In cloud computing, a cloud server is typically responsible for providing and managing applications running at the cloud server. The data of the applications can be stored remotely in a cloud database. These applications are designed only for running on top of the special operating system of the cloud server. The cloud server and the computing devices have different operating systems and running environments. Typically applications designed for the cloud may not be downloaded and installed by the users on their own computing devices, because processing and storage for the applications are maintained by the cloud server and cloud database.

SUMMARY

Technology introduced herein provides a mechanism to migrate at least portions of computer applications to a server. According to at least one embodiment, a computing device identifies a service component of a computer application executed at the computing device. The service component does not directly interact with a user of the computing device. The computing device transfers an instance of the service component to a server so that the service component is executed at the server. The computing device then receives from the server a result message generated by the instance of the service component executed at the server. The computing device feeds the result message to a user interface component of the computer application via a procedure call such that the user interface component retrieves the result message as if it was generated by an instance of the service component executed at the computing device.

Migration of the applications to the server can free up device resources and improve device power management, since the server uses its resource to execute the components of the applications and consolidates data changes (e.g., generated by the migrated applications). The overall performance of the device can be improved, because the operating system of the device has better knowledge when to synchronize data than an individual application. Cloud servers typically have faster processors, memory and storage devices. Applications that use intensive hardware resources (e.g., CPU or I/O intensive tasks) can benefit from increased efficiency by running in the cloud server. Therefore, it usually takes less time to run the application in the cloud than running it at the computing device.

In accordance with the techniques introduced here, therefore, a computing device is provided. The computing device includes a processor, a networking interface, an output device and an operating system including a migration module. The migration module include instructions which, when executed by the processor, monitor a computer application executed at the computing device, and identify a background thread and a foreground thread of the computer application. The networking interface is configured to transfer an instance of the background thread to a server, and to receive from the server result data generated by the instance of the background thread executed at the server. The output device is configured to present content of the result data via a user interface generated by the foreground thread. The foreground thread generates the user interface based on the result data as if the result data was generated by an instance of the background thread executed at the computing device.

In accordance with the techniques introduced here, therefore, a server for executing computer applications designed for computing devices is also provided. The server includes a processor, a networking interface and an application monitoring module. The networking interface is configured to communicate with at least one computing device. The application monitoring module is configured to, when executed by the process, monitor a computer application executing at the computing device, and to identify a service component of the computer application. The service component can be, for example, handling a computing task which does not need to receive input data from or send output data from input/output ("I/O") devices of the computing device. Alternatively, the service component can be handling a computing task which handles heavy network inputs and storage I/Os (for writing data received from the network to the local storage). The networking interface can retrieve from the computing device an instance of the service component or data sufficient for the server to carry out the same functionality of the service component. The processor executes the instance of the service component at the server. The networking interface then synchronizes data generated by the instance of the service component executing at the server with data on which a user interaction component of the computer application executing at the computing device operates. The server can include a virtualized instance of a computing device, or a runtime application that mimics a computing device.

There are different ways of migrating applications to the server. The ways of application migration can be optimized for different goals. For instance, applications can be migrated in order to optimize the power usage of the computing device. The computing device can minimize the CPU running time and network component running time by letting the server execute the service component instead. The energy cost of receiving the result data from the server can be a fraction of the energy cost of running the service component locally at the computing device. Alternatively, applications can be migrated in order to optimize the network bandwidth of the computing device. The service component may need to download a large amount of the data from the network and process the data to generate result data. The total size of the result data to be received by the computing device from a service component running at the server can be a fraction of the total size of data to be received by the computing device from the network when the service component has been executed locally at the computing device.

In accordance with the techniques introduced here, therefore, a method for executing a photo application at a mobile device is provided. The method includes monitoring the photo application executing at the mobile device to identify a background thread and a foreground thread of the photo application, where the background thread performs a photo processing task of a given photo. The foreground thread of the photo application provides a user interface to access a processed image through the mobile device, where the background thread does not directly interact with a user of the mobile device.

The method includes receiving a photo for processing and displaying using the photo application. The method includes determining a current workload of the mobile device. The method includes transmitting, from the mobile device to a server, the received photo and an instance of a background component of the photo application when the determined current workload exceeds a predefined threshold, the background component of the photo application including information to enable the server to run an instance of the background thread, the instance of the background component of the photo application being transferred when the server does not have a pre-existing instance of the background component.

The method includes transmitting, from the mobile device to a server, the received photo and an instance of a background component of the photo application when the determined current workload exceeds a predefined threshold. The background component of the photo application includes information to enable the server to run an instance of the background thread. The instance of the background component of the photo application is transferred to the server when the server does not have a pre-existing instance of the background component The method includes receiving a processed photo from the server, where the processing of the photo is performed by executing the background thread at the server. The method further includes providing access to the processed photo through the mobile device using the user interface generated by the foreground thread of the photo application. The foreground thread utilizes the processed photo to provide access through the user interface as if the processed photo was generated by an instance of the background thread executed at the mobile device.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Figure 1:
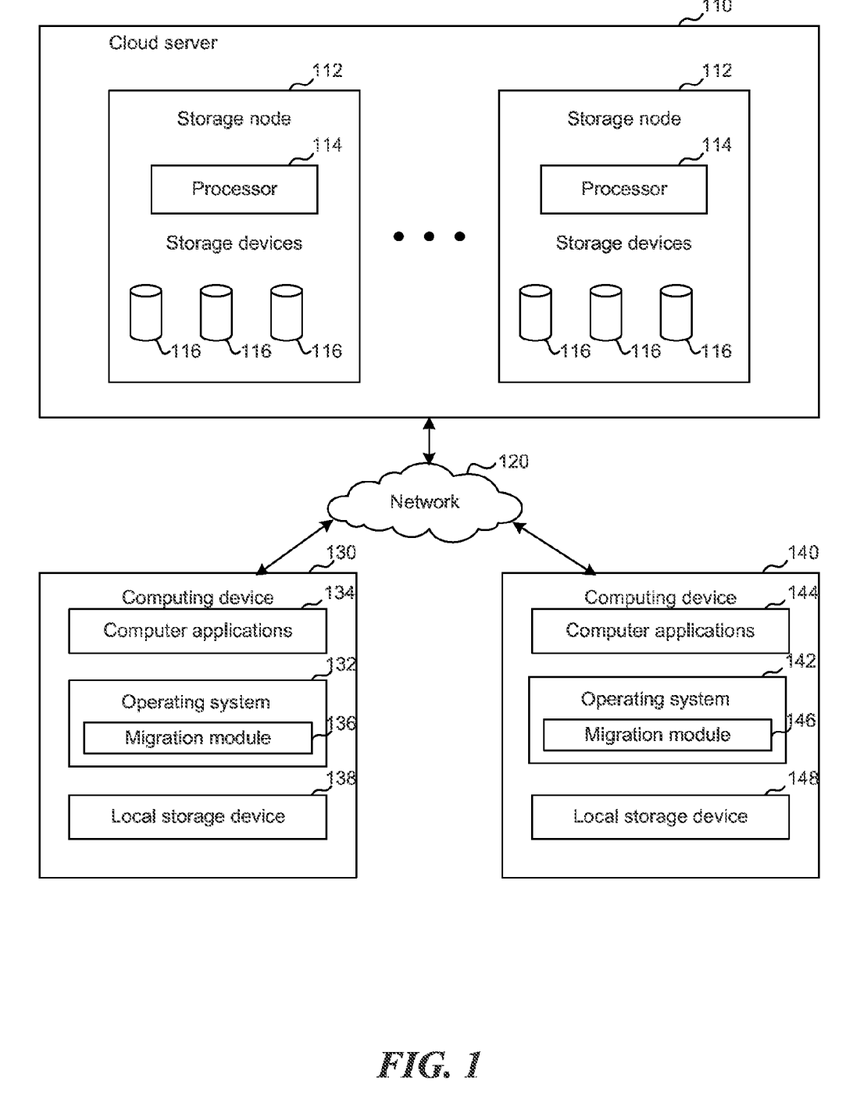
FIG. 1 illustrates an example system for computing devices connected to a cloud server.

FIG. 1 illustrates an example system for computing devices connected to a cloud server. The system includes a cloud server 110 configured to communicate with the computing devices. In one embodiment, the cloud server 110 can be a server cluster having computer nodes interconnected with each other by a network. The cloud server 110 can contain storage nodes 112. Each of the storage nodes 112 contains one or more processors 114 and storage devices 116. The storage devices can include optical disk storage, RAM, ROM, EEPROM, flash memory, phase change memory, magnetic cassettes, magnetic tapes, magnetic disk storage or any other computer storage medium which can be used to store the desired information.

The computing devices 130 and 140 can each communicate with the cloud server 110 via network 120. The network 120 can be, e.g., the Internet. Although FIG. 1 illustrates two computing devices 130 and 140, a person having ordinary skill in the art will readily understand that the technology disclosed herein can be applied to a single computing device or more than two computing devices connected to the cloud server 110.

The computing device 130 includes an operating system 132 to manage the hardware resources of the computing device 130 and provides services for running computer applications 134 (e.g., mobile applications running on mobile devices). The computer applications 134 stored in the computing device 130 require the operating system 132 to properly run on the device 130. The computing device 130 includes at least one local storage device 138 to store the computer applications and user data. The computing device 130 or 140 can be a desktop computer, a laptop computer, a tablet computer, an automobile computer, a game console, a smart phone, a personal digital assistant, or other computing devices capable of running computer applications, as contemplated by a person having ordinary skill in the art.

The computer applications 134 stored in the computing device 130 can include applications for general productivity and information retrieval, including email, calendar, contacts, and stock market and weather information. The computer applications 134 can also include applications in other categories, such as mobile games, factory automation, GPS and location-based services, banking, order-tracking, ticket purchases or any other categories as contemplated by a person having ordinary skill in the art.

The operating system 132 of the computing device 130 can include a migration module 136 to manage migrations of computer applications from the computing device 130 to cloud server 110. Instead of executing computer applications 134 directly at the computing device 130, the migration module 136 can identify certain portions of the computer applications 134 suitable to be executed at the cloud server 110, e.g. the background components of the computer applications 134. The migration module 136 sends the background components to the cloud server 110 so that the cloud sever 110 can execute the background components for the computer device 130. For instance, the migration module 136 may identify that an application includes both a service component for background computing and an activity component for providing user interfaces interacting with a user. The migration module 136 may decide to migrate the service component to the cloud server 110 so that the computing task of the service component is offloaded to the cloud server 110.

The computer applications 134 running at the computing device 130 (e.g. foreground components of the computer applications 134) need not be aware that the background components of the computer applications 134 are executed at the cloud server 110 separate from the computing device 130. The migration module 136 can be responsible for retrieving the data generated by the background components executed at the cloud server 110 back to the computing device 130. The foreground components of the computer applications 134 can read these data as if they are generated by background components executed at the computing device 130 itself.

Figure 2:
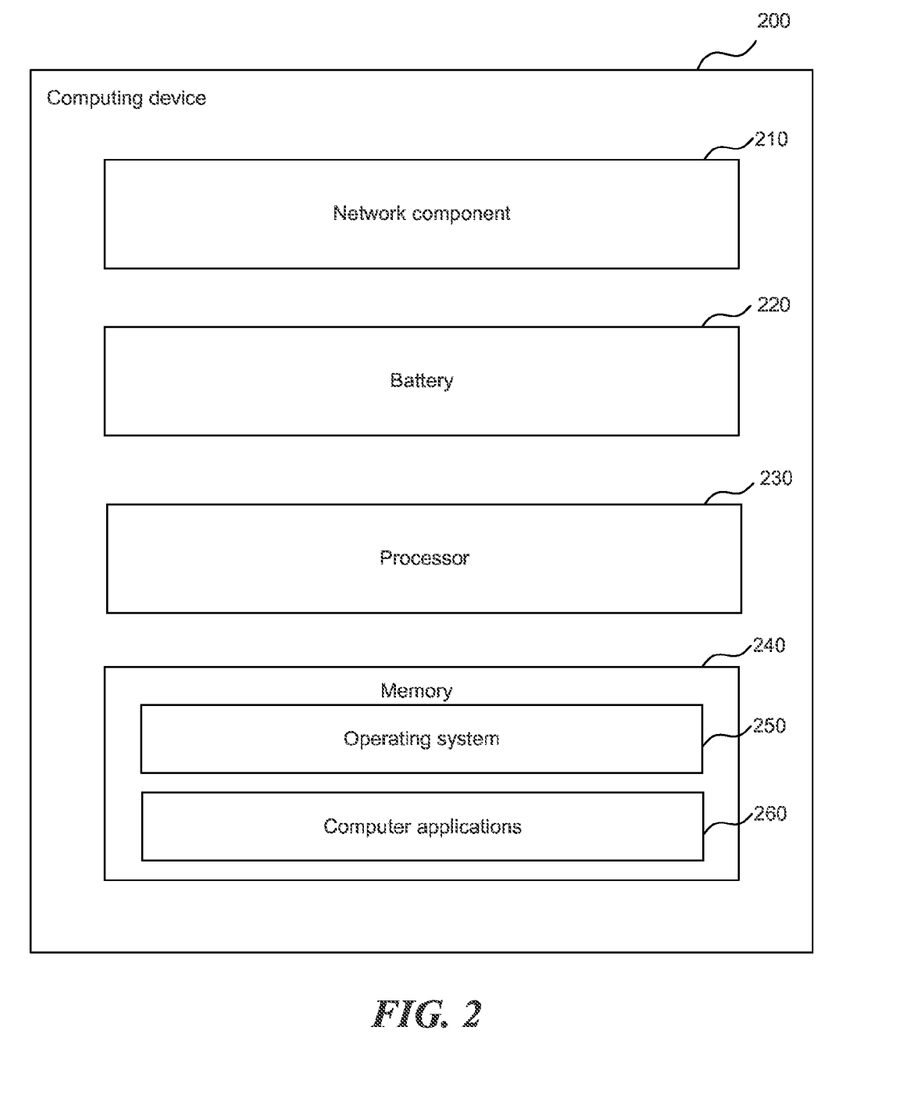
FIG. 2 illustrates an example of a computing device that can communicate with a cloud server.

FIG. 2 illustrates an example of a computing device that can communicate with a cloud server, according to one embodiment. The computing device 200 can include a networking component 210, a battery 220, a processor 230 and a memory component 240. The memory 240 can store instructions of an operating system 250 of the computing device 200. The memory 240 can further store instructions of one or more computer applications 260 designed to run at the computing device 200.

The networking component 210 can be capable of switching between states including a high power consumption state and a low power conservation state. The network component 210 can be, e.g. a WiFi networking adapter, a cellular phone networking adapter, or a combination thereof. The battery 220 is configured to provide power to the networking component and other components of the computing device 200. The computing device may further include a power adapter to be connected to a power source to provide power for the computing device 200, in addition to the power provided the battery 220.

The processor 230 is configured to run computer applications 260 and the operating system 250 of the computing device 200. The memory 240 stores instructions of the operating system 250 which, when executed by the processor 230, cause the operating system 250 to perform processes for realizing certain functionalities of the computing device 200.

For instance, the process of the operating system 250 can receive, from a cloud server (e.g., cloud server 110 in FIG. 1), an instruction to migrate a background component of one of the computer applications 260 to the cloud server. The cloud server may monitor the computer applications 260 running at the computing device 200 and determine which background component is suitable to run on the cloud server to reduce the workload of the computing device 200. The cloud server then requests and executes the background component at the server and sends back a result to the computing device 200. A foreground component of the same computer application may read the result and present the content of the result via an output device (e.g. a display) of the computing device 200.

The technology benefits the computing device in many ways. The performance of the application can be better. The execution of the background component at the server can be faster, since the server may have much more powerful hardware resources than the computing device. Alternatively, the efficiency of the local hardware resources of the computing devices can be improved. Since the background component has been migrated to the server, this frees up the local hardware resources (e.g. CPU and memory) of the computing devices to handle the local applications and operating system in a more efficient way. Furthermore, the technology may extend the battery life of the device. For instance, the computing device 200 can stay at a low power conservation state initially. When the server requests the background component, the computing device 200 switches to a high power consumption state and transmits the data for an instance of the background component to the server. The computing device 200 can again switch back to the low power conservation state after sending out an instance of the background component. When the server sends back the result after executing the background component, the computing device 200 switches to the high power consumption state to handle the result. In this way, the battery power and the hardware resources of computing device 200 are optimized and utilized in a more efficient way. As a result, the battery life of the computing device 200 can be extended.

Alternatively, instead of the server, the operating system 250 itself can monitor the computer applications 260 running at the computing device and determine which background component of a computer application is suitable to be executed at the server to reduce the workload of the computing device 200. Once the background component is migrated to the server, the server can execute the background component and send back the result to the computing device 200.

Figure 3:
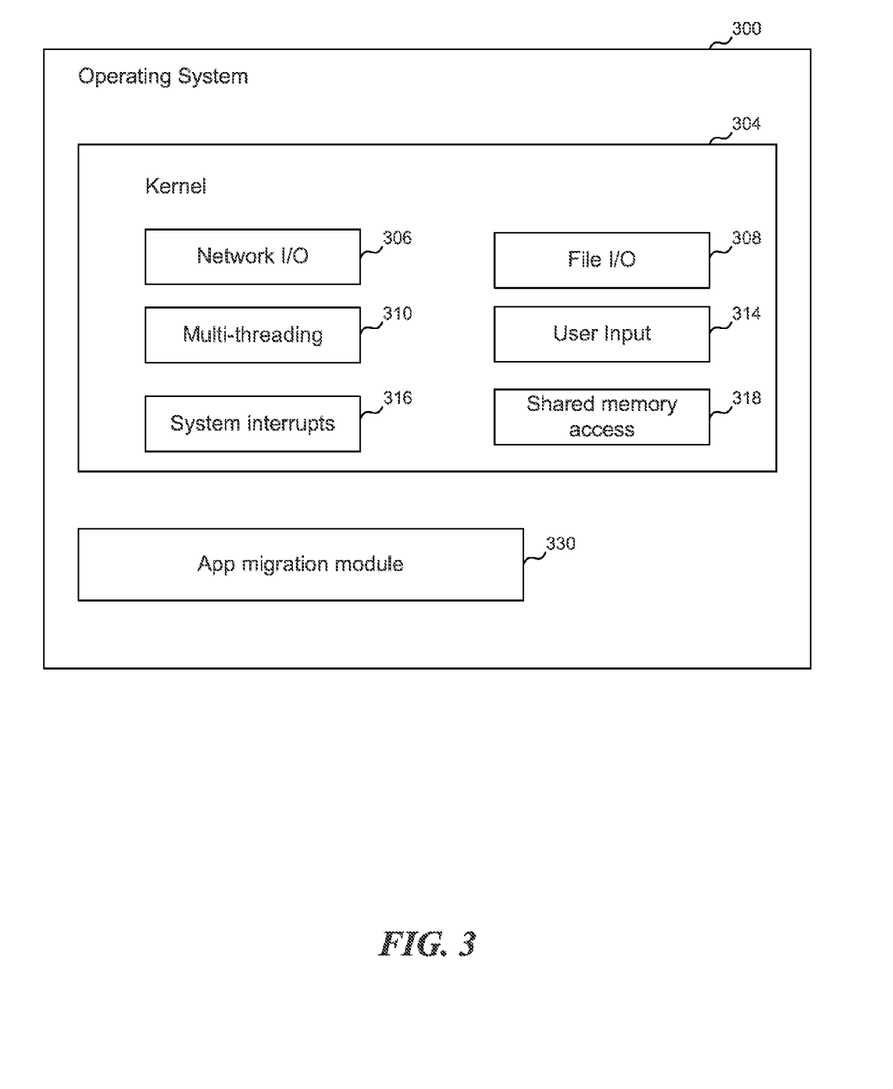
FIG. 3 illustrates an example operating system of a computing device that can be used for multiple-device caching.

FIG. 3 illustrates an example operating system of a computing device that can be used for multiple-device caching, according to one embodiment. The operating system 300 includes a kernel 304. The kernel 304 provides interfaces to hardware of the electronic device for the computer applications running on top of the kernel 304, and supervises and controls the computer applications. The kernel 304 isolates the computer applications from the hardware. The kernel 304 may include one or more intervening sources that can affect execution of a computer application. In one embodiment, the kernel 304 includes a network I/O module 306, a file I/O module 308, multi-threading module 310, user input 314, system interrupts 316, and shared memory access 318.

An app migration module 330 can run on top of the kernel 304. Alternatively the kernel 304 can be modified to include the app migration module 330. The app migration module 330 is responsible for migrating at least a portion of an application to a server. For instance, the app migration module 330 can monitor the application and maintain a network connection with a storage server. The application may include multiple threads, e.g. a background thread (e.g., a service component) and a foreground thread (e.g., an activity component). When the app migration module 330 determines that the background thread does not interact directly with a user of the computing device, the app migration module 330 sends an instance of the background thread to the server. The server executes the background thread and sends back result data generated by the background thread. The app migration module 330 further feeds the result data to the foreground component as if the result data was generated by an instance of the background thread executed at the computing device.

Figure 4:
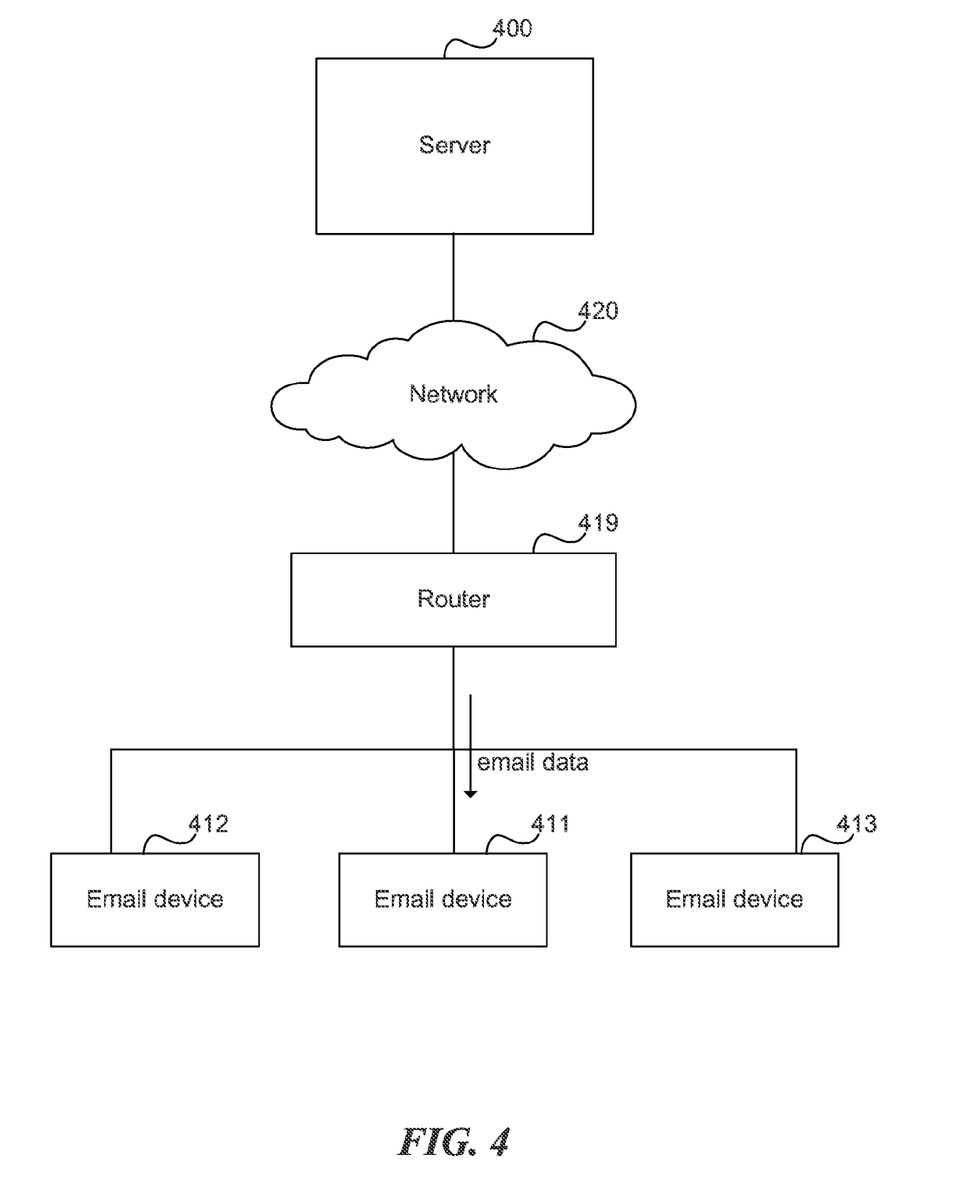
FIG. 4 illustrates an example of email devices connected to a cloud-based server.

The technology disclosed herein can be applied to various computing devices including, e.g., devices capable of receiving emails or internet messages. For instance, FIG. 4 illustrates an example of email devices connected to a cloud-based server. As depicted in FIG. 4, a server 400 may provide a cloud-based service for running a background component of an email application designed for email devices 411-413. The server 400 retrieves an instance of the background component over a network 420. The network 420 can be, e.g., the Internet. Examples of email devices 411, 412 and 413 may include, but are not limited to, a mobile phone, a smartphone, a personal digital assistant (PDA), a tablet, a mobile game console, a laptop computer, a desktop computer, or any other devices having communication capability.

In some embodiments, server 400 may monitor or measure resource usage or workload of the devices. In some embodiments, the resource usage may be associated with resource usage of a central processing unit (CPU) of the devices, resource usage of a graphic processing unit (GPU) of the devices, resource usage of a main memory of the devices, and/or resource usage of a graphic memory of the devices, etc.

For example, in some embodiments, server 400 may determine or identify, a background component of an email application running at device 411. The background component is responsible for inquiring and retrieving emails from a remote email server. The email application also includes a foreground component responsible for presenting the email to a user of the email device 411 via an output device (e.g. a display). The email device 411 can send an instance of the background component to the server 400 and stop executing the background component at the device 411. In turn, the server 400 starts executing the background component for inquiring and retrieving emails for device 411.

The server 400 continues to monitor the email application running at the email device 411. For instance, when the email device 411 runs the foreground component at a background of an operating system of the device 411, the server 400 can avoid sending the retrieved emails to the device 411 by caching the received email on the server 400 itself. Once the foreground component is switched to a foreground of the operating system of the device 411, the server 400 can send to the device 411 emails retrieved by the background component of the email application executed at the server 400.

A person having ordinary skill in the art can readily understands that the types of device illustrated in FIG. 4 can be different. For example, email devices 411, 412 and 413 can be, e.g., tablets, smart phones or laptop computers respectively. The server 400 is capable of executing applications designed for these different types of devices.

Figure 5:
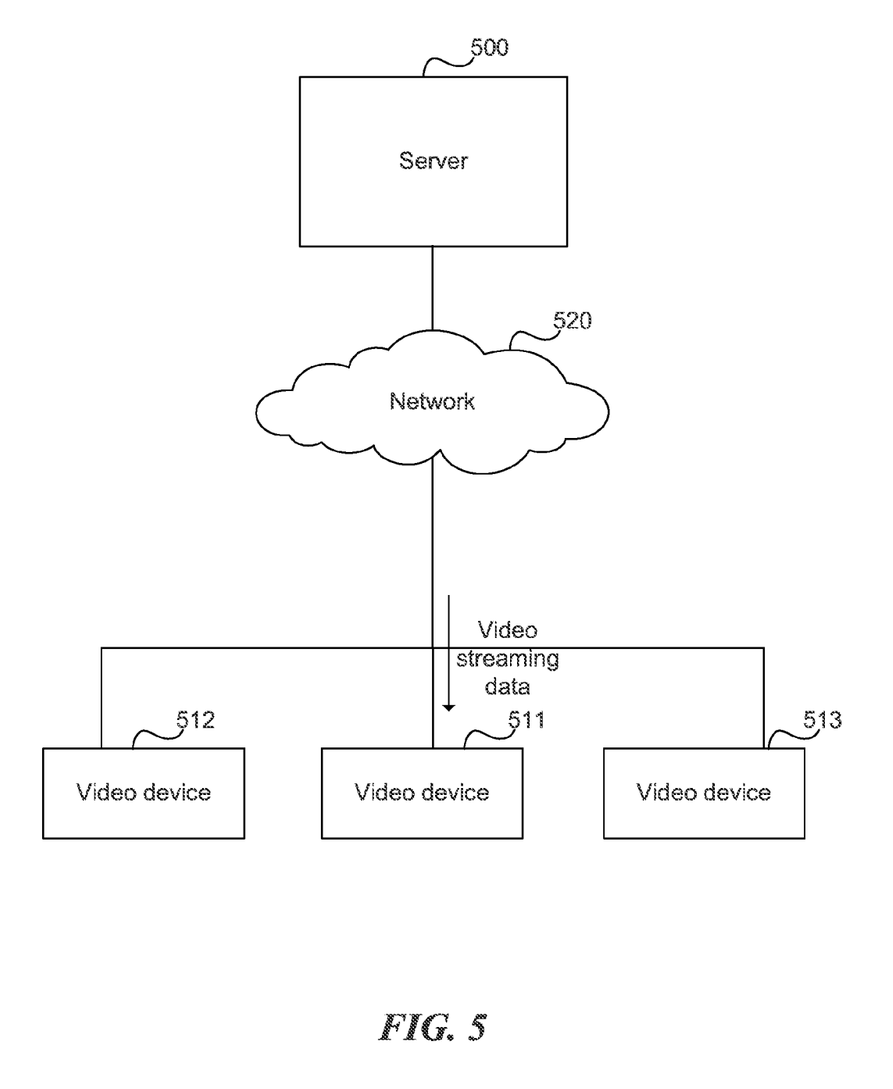
FIG. 5 illustrates an example of video streaming devices connected to a cloud-based server.

Similarly, the technology disclosed herein can be applied to devices for steaming video or other types of data steaming. For instance, FIG. 5 illustrates an example of video streaming devices connected to a cloud-based server. As depicted in FIG. 5, a server 500 may provide a cloud-based service for running a background component of a video streaming application designed for video devices 511-513. The server 500 retrieves an instance of the background component over a network 520. Examples of video devices 511, 512 and 513 may include, but are not limited to, a mobile phone, a smartphone, a personal digital assistant (PDA), a tablet, a mobile game console, a laptop computer, a desktop computer, or any other devices having communication capability.

In some embodiments, server 500 may determine or identify, a background component of a video streaming application running at device 511. The background component is responsible for inquiring and retrieving video streaming packets from a remote content server. The video streaming application also includes a foreground component responsible for playing the streaming video to a user of the video device 511 via an output device (e.g. a display). The video device 511 sends an instance of the background component to the server 500 and stops executing the background component at the device 511. In turn, the server 500 starts executing the background component for inquiring and retrieving video streaming packets for device 511.

The server 500 continues to monitor the application running at the video device 511. For instance, when the video device 511 runs the foreground component at a foreground of an operating system of the device 511, the server 500 can continue to forward the video streaming packets received by the background component running at the server 500 to the video device 511 in real time as soon as the background component receives them. Once the foreground component is switched to a background of the operating system of the device 511, the server 500 can continue to run the background component, but stop sending the video streaming packets to the video device 511. The video streaming packets are cached in the server 500 so that they can be sent to video device 511 if the foreground component is switched back to the foreground of the operating system of the device 511.

Figure 6:
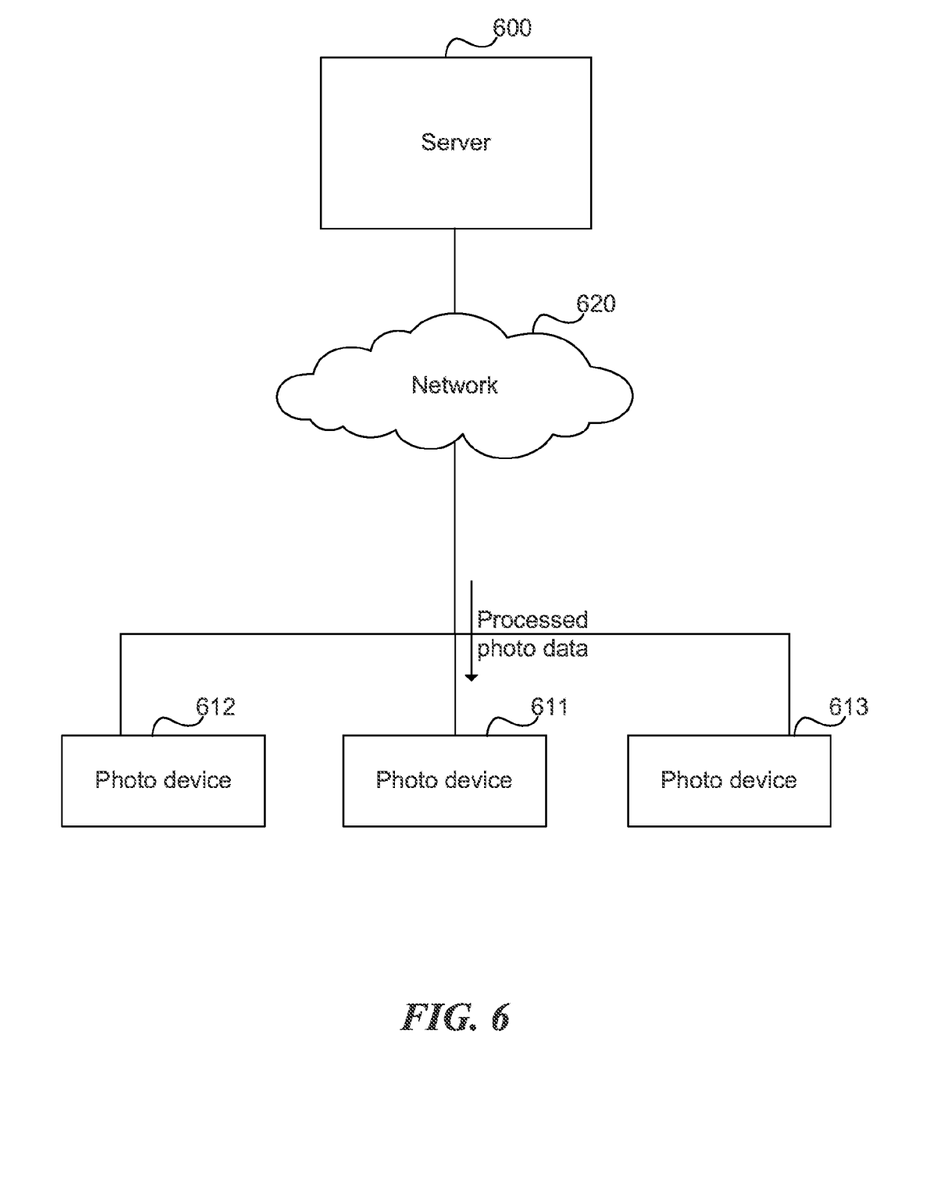
FIG. 6 illustrates an example of photo devices connected to a server.

The technology disclosed herein can also be applied to devices for processing photos or other types of data. For instance, FIG. 6 illustrates an example of photo devices 611-613 connected to a server 600. As depicted in FIG. 6, a server 600 may provide a cloud-based service for running a background component of a photo processing application designed for photo devices 611-613.

In some embodiments, server 600 may monitor or measure resource usage or workload of the photo devices. For example, in some embodiments, server 600 may determine or identify, a background component of a photo application running at device 611. The video streaming application can include a foreground component responsible for receiving photo data from, e.g., a camera device of the device 611 and playing the photo to a user of the device 611 via an output device (e.g. a display). The background component of the photo application is responsible for processing the photo. The processing of the photo can include, e.g., resizing, filtering, exposure adjusting, color adjusting, file format changing or editing of the photo. The photo device 611 sends an instance of the background component to the server 600 and stops executing the background component at the device 611. The photo device 611 can further send a photo to be processed by the background component to the server 600. In turn, the server 600 starts executing the background component for processing the photo for device 611.

The server 600 continues to monitor the photo application running at the photo device 511. For instance, when the photo device 611 runs the foreground component at a foreground of an operating system of the device 611, the server 600 can send the processed photo data back to the device 611 as soon as the background component finishes processing the photo at the server 600. If the foreground component is switched to the background of the operating system of the device 611, the server 600 can continue to run the background component for any incoming photo processing tasks, but stop sending the processed photo data to the photo device 611. The processed photo data are cached in the server 600 so that they can be sent to photo device 611 if the foreground component is switched back to the foreground of the operating system of the device 611.

Figure 7:
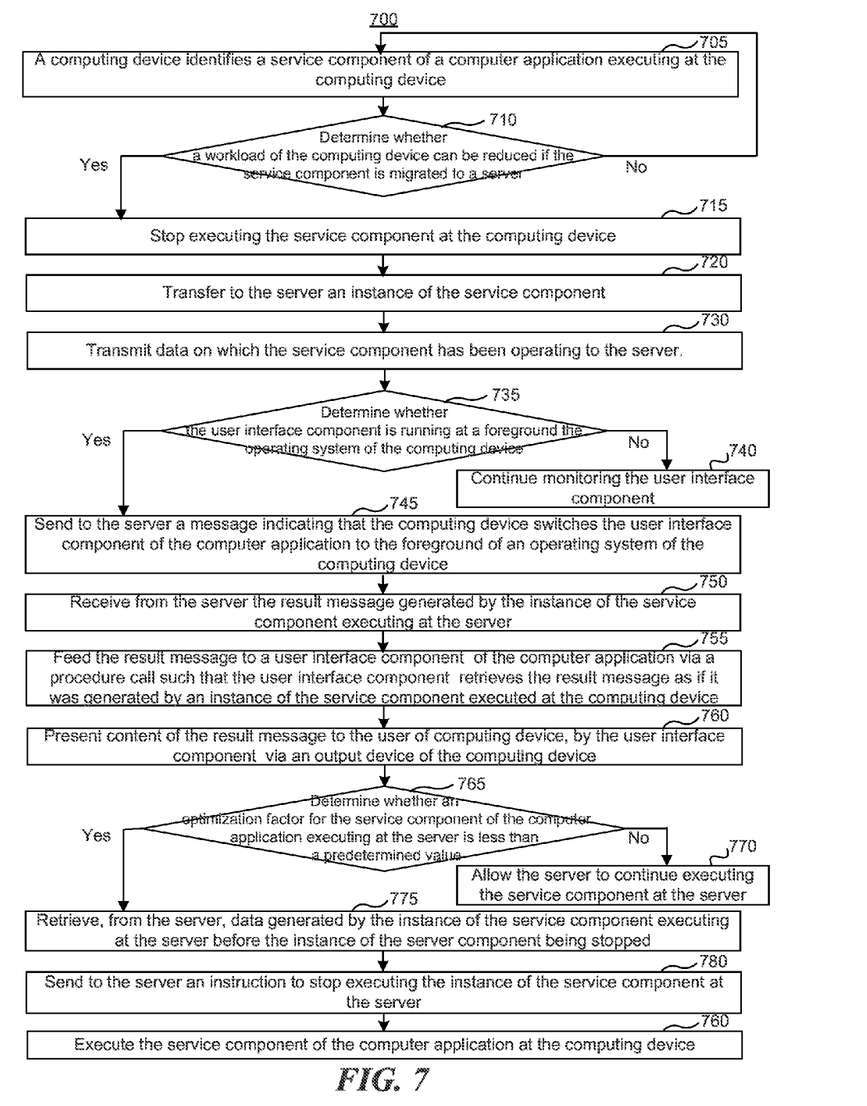
FIG. 7 illustrates an example of a process for migrating computer applications from a computing device to a server.

As illustrated in the figures, computing devices can communicate with the cloud server to migrate and offload some portions of the computer applications to the cloud server. The cloud server acts as a surrogate hardware resource for executing the migrated portions of the applications. FIG. 7 illustrates an example of a process 700 for migrating computer applications from a computing device to a server. The process 700 starts at step 705, where a computing device identifies a service component of a computer application executing at the computing device. The computer application can include the service component (e.g., a background component) and a user interaction component (e.g., a foreground component). The service component does not directly interact with a user of the computing device, while the user interface component interacts with the user via user interfaces generated by the user interface component. In some embodiments, the service component and the user interface component of the computer application can execute at the computing device as two threads belonging to a process of the computer application. For instance, the service component can be configured to execute at the computing device as a background thread managed by an operating system of the computing device. The service component can be designed to handle computing tasks, e.g., a CPU intensive task, a GPU intensive task, a memory intensive task, a power intensive task, or a data input/output intensive task.

At step 710, the computing device determines whether a workload of the computing device can be reduced if the service component is migrated to a server. If so, the process 700 continues to step 715. Otherwise, the process goes back to step 705 to identify a service component of another computer application executing at the computing device.

At step 710, the computing device stops executing the service component at the computing device. Then at step 720, the computing device transfers to the server an instance of the service component. Alternatively, the computing device can just notify the server to start or restart an instance of the service component at the server, if the server has the instance of the service component. In some embodiments, the server have a mirror of the data (including the service component) of the computing device, there can be minimal work to migrate the service component over to the server if the server has an instance of the service component and its state data that are synchronized with the counterparts of the computing device.

Optionally at step 730, the computing device can further transmit data on which the service component has been operating to the server. Once the server receives the service component and corresponding data, the server starts executing the service component at the server.

The computing device may choose not to receive data generated by the service component executed at the server, when the corresponding user interface component at the computing device is switched to a background of an operating system of the computing device. At step 735, the computing device determines whether the user interface component is running at a foreground of the operating system of the computing device. If so, the process 700 continues to step 745. Otherwise, at step 740, the computing device continues monitoring the user interface component.

Optionally at step 745, the computing device sends to the server a message indicating that the computing device switches the user interface component of the computer application to the foreground of an operating system of the computing device. Upon receiving the message, the server can send out a result message as a response. At step 750, the computing device receives from the server the result message generated by the instance of the service component executing at the server.

At step 755, the computing device feeds the result message to a user interface component of the computer application via a procedure call such that the user interface component retrieves the result message as if it was generated by an instance of the service component executed at the computing device. The procedure call can be, e.g., a remote procedure call (RPC) generated by an operating system of the computing device for a thread of the user interface component. Optionally at step 760, the computing device can present content of the result message to the user of computing device, by the user interface component via an output device of the computing device.

The server can continue to execute the service component at the server. The server or the computing device may determine certain optimization factors in order to decide whether to stop executing the service component at the server. For instance, at step 765, the computing device can determine whether an optimization factor for the service component of the computer application executing at the server is less than a predetermined value. The optimization factor may depend on, e.g., a CPU resource, a GPU resource, a memory resource, a power level, a data input/output amount, or a completion time needed for the instance of the background component to continue executing at the server.

If the optimization factor is larger than the predetermined value, at step 770, the computing device allows the server to continue executing the service component at the server (by, e.g., avoiding sending further instruction to the server). If the optimization factor is less than the predetermined value, at step 775, the computing device may retrieve, from the server, data generated by the instance of the service component executed at the server before the instance of the server component is stopped. At step 780, the computing device sends to the server an instruction to stop executing the instance of the service component at the server. At step 785, the computing device may choose to execute the service component of the computer application at the computing device.

Alternatively, the server can determine whether to stop executing the service component at the server. The server may monitor the status of the computing device and determine the optimization factor for the service component. Based on the optimization factor, the server may decide whether it is advantageous to continue executing the migrated background component.

Those skilled in the art will appreciate that the logic illustrated in FIG. 7 and described above, and in each of the flow diagrams discussed below if any, may be altered in a variety of ways. For example, the order of the logic may be rearranged, substeps may be performed in parallel, illustrated logic may be omitted, other logic may be included, etc. For instance, the process 700 may transfer the instance of the service component to the server before stopping executing the service component at the computing device.

Figure 8:
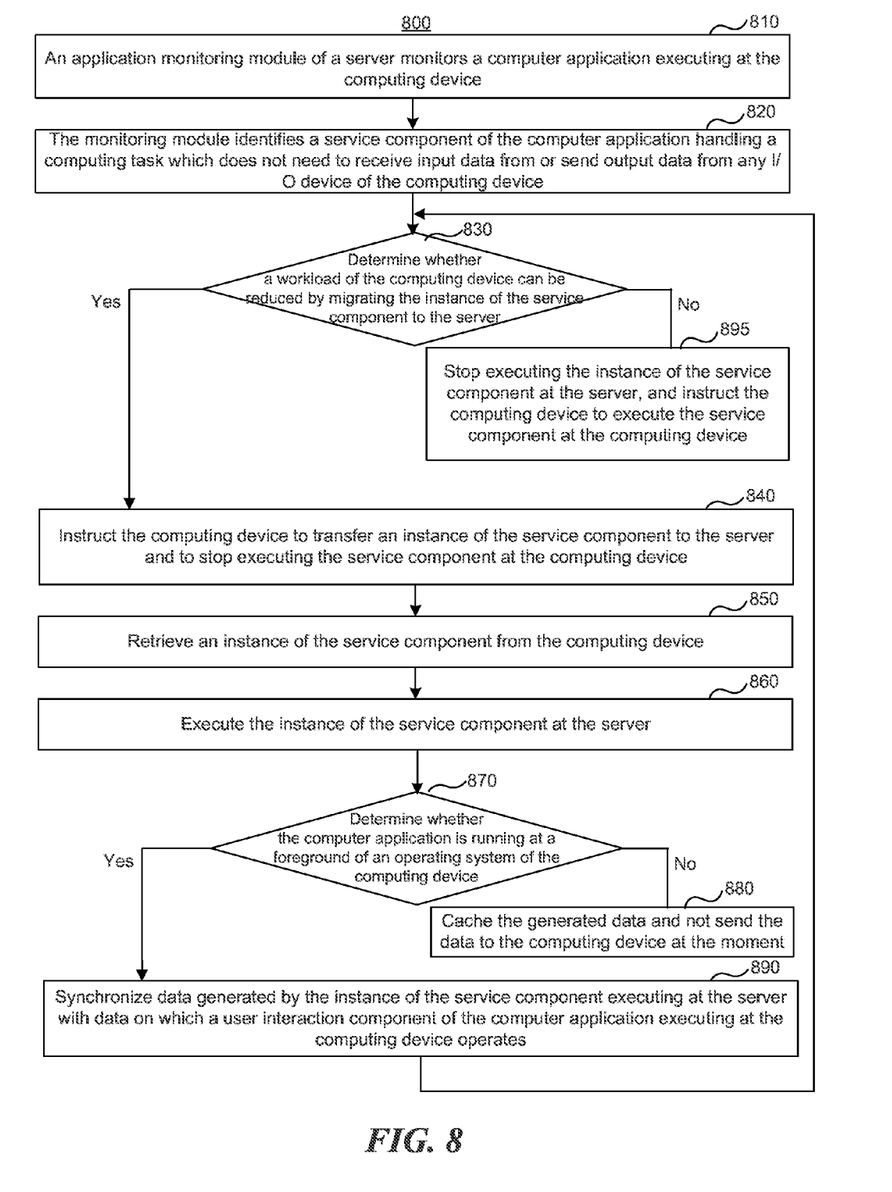
FIG. 8 illustrates an example of an alternative process for migrating applications from computing devices to a server.

The server, instead of the computing device, can also monitor the computer applications running at the computing devices and control the application migration process. FIG. 8 illustrates an example of an alternative process 800 for migrating applications from computing devices to a server. The process 800 starts at step 810, where an application monitoring module of a server monitors a computer application executing at the computing device. The application monitoring module may be a part of an operating system of the computing device. At step 820, the monitoring module identifies a service component of the computer application handling a computing task which does not need to receive input data from or send output data from any I/O device of the computing device.

At step 830, the application monitor module determines whether a workload of the computing device can be reduced by migrating the instance of the service component to the server. If so, at step 840, the server instructs the computing device to transfer an instance of the service component to the server and to stop executing the service component at the computing device.

At step 850, the server retrieves an instance of the service component from the computing device. The server may further retrieve from the computing device the data needed for running the service component.

At step 860, the server executes the instance of the service component at the server. The service component executed at the server generates new data. The server may decide whether to send back the generated data based on the status of the computer application at the computing device. For instance, at step 870, the server may determine whether the computer application is running at a foreground of an operating system of the computing device. The determination may be based on a signal from the computing device indicating that the computing device switches the computer application to the foreground of an operating system of the computing device. If the computing application is not running at the foreground of the operating system, at step 880, the server may cache the generated data and not send the data to the computing device at the moment. If the computing application is running at the foreground of the operating system, at step 890, the server may synchronize data generated by the instance of the service component executing at the server with data on which a user interaction component of the computer application executing at the computing device operates.

The process 800 can continue to step 830 to determine whether a workload of the computing device can be reduced by migrating the instance of the service component to the server. If the server determines that the workload is not reduced by the application migration, at step 895, server can stop executing the instance of the service component at the server, and instruct the computing device to execute the service component at the computing device.

Figure 9:
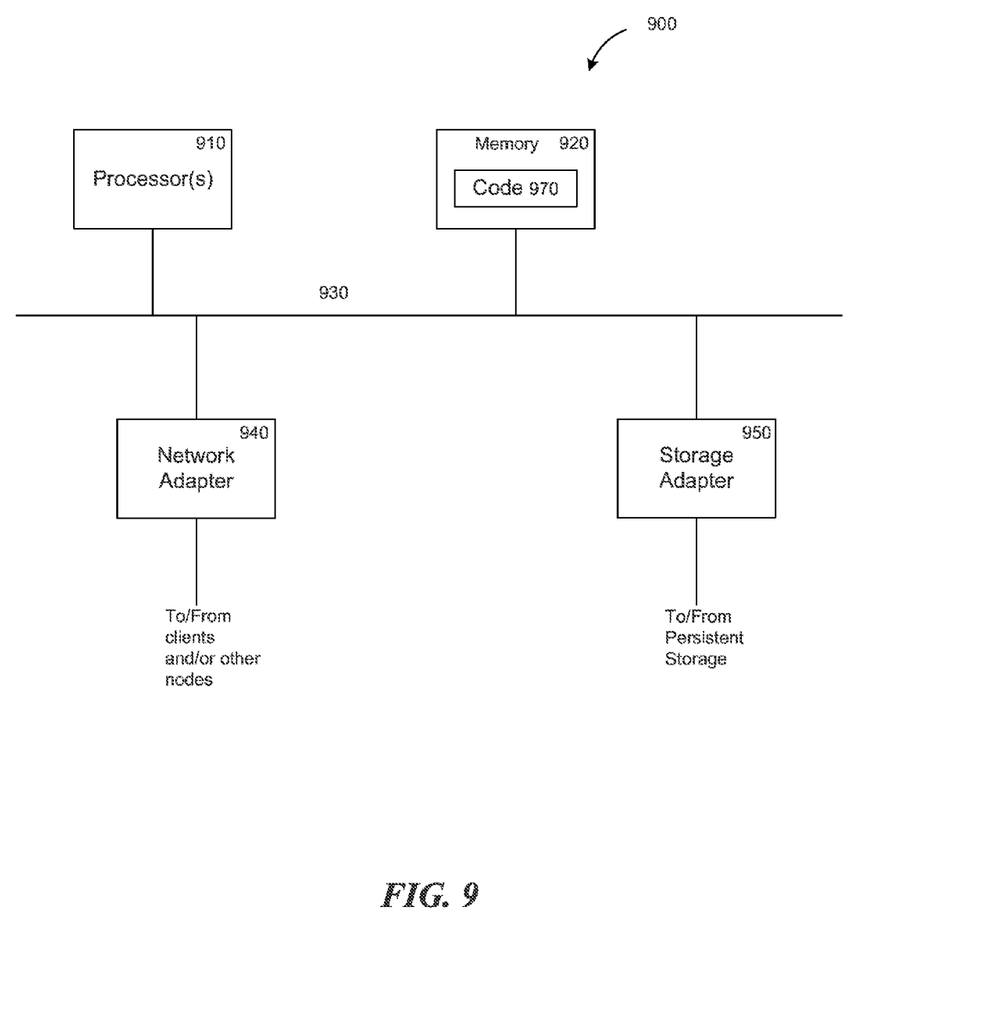
FIG. 9 is a high-level block diagram showing an example of the architecture of a computer, which may represent any computing device or server described herein.

FIG. 9 is a high-level block diagram showing an example of the architecture of a computer 900, which may represent any computing device or server described herein. The computer 900 includes one or more processors 910 and memory 920 coupled to an interconnect 930. The interconnect 930 shown in FIG. 9 is an abstraction that represents any one or more separate physical buses, point to point connections, or both connected by appropriate bridges, adapters, or controllers. The interconnect 930, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 910 is/are the central processing unit (CPU) of the computer 900 and, thus, control the overall operation of the computer 900. In certain embodiments, the processor(s) 910 accomplish this by executing software or firmware stored in memory 920. The processor(s) 910 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 920 is or includes the main memory of the computer 900. The memory 920 represents any form of random access memory (RAM), read-only memory (ROM), flash memory, or the like, or a combination of such devices. In use, the memory 920 may contain a code 970 containing instructions according to the technology disclosed herein.

Also connected to the processor(s) 910 through the interconnect 930 are a network adapter 940 and a storage adapter 950. The network adapter 940 provides the computer 900 with the ability to communicate with remote devices, over a network and can be, for example, an Ethernet adapter or Fibre Channel adapter. The network adapter 940 may also provide the computer 900 with the ability to communicate with other computers. The storage adapter 950 allows the computer 900 to access a persistent storage, and may be, for example, a Fibre Channel adapter or SCSI adapter.

The code 970 stored in memory 920 may be implemented as software and/or firmware to program the processor(s) 910 to carry out actions described above. In certain embodiments, such software or firmware may be initially provided to the computer 900 by downloading it from a remote system through the computer 900 (e.g., via network adapter 940).

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method for executing a photo application at a mobile device, the method comprising:

monitoring the photo application executing at the mobile device to identify a background thread and a foreground thread of the photo application, the background thread performing a photo processing task of a given photo, the foreground thread of the photo application providing a user interface to access a processed image through the mobile device, wherein the background thread does not directly interact with a user of the mobile device;

receiving a photo for processing and displaying using the photo application;

determining a current workload of the mobile device;

transmitting, from the mobile device to a server, the received photo and an instance of a background component of the photo application when the determined current workload exceeds a predefined threshold, the background component of the photo application including information to enable the server to run an instance of the background thread, the instance of the background component of the photo application being transferred when the server does not have a pre-existing instance of the background component;

receiving a processed photo from the server, wherein the processing of the photo is performed by executing the background thread at the server; and providing access to the processed photo through the mobile device using the user interface generated by the foreground thread of the photo application, wherein the foreground thread utilizes the processed photo to provide access through the user interface as if the processed photo was generated by an instance of the background thread executed at the mobile device.

2. The method of claim 1, wherein transmitting, from the mobile device to the server, the received photo and the instance of the background component of the photo application further comprises:

stopping executing of the background thread at the mobile device;

transmitting, from the mobile device to the server, the received and other data on which the mobile device has been operating.

3. The method of claim 1, wherein the photo processing being performed on the given photo by the background thread includes resizing, filtering, exposure adjusting, color adjusting, file format changing or editing.

4. The method of claim 1, wherein a given background thread includes a CPU intensive task, a GPU intensive task, a memory intensive task, a power intensive task, or a data input/output intensive task.

5. The method of claim 1, further comprising:

determining an optimization factor for the background thread of the photo application executing at the server;

if the optimization factor is less than a predefined threshold value, sending, from the mobile device to the server, an instruction to stop executing the instance of the background thread at the server;

executing the background thread of the photo application at the computing device.

6. The method of claim 5, further comprising:

retrieving, from the server, data generated by the instance of the background thread executing at the server before the instance of the background thread is stopped.

7. The method of claim 5, wherein the optimization factor depends on a CPU resource, a GPU resource, a memory resource, a power, a data input/output amount, or a completion time needed for the instance of the background thread to continue executing at the server.

8. The method of claim 1, wherein the foreground thread is notified of the receiving of the processed photo via an inter-thread communication as if an instance of the background thread executed at the mobile device initiated the inter-thread communication.

9. The method of claim 1, wherein the foreground thread is configured to allow the user of the mobile device access to the processed photo using the user interface generated using the foreground thread.

10. The method of claim 1, wherein the processed photo and other access related data on which the foreground thread operates at the mobile device is synchronized with the received photo and other processing related data on which the background thread operates at the server.

11. The method of claim 1, wherein the background thread is configured to handle a given photo processing task without sending data to or receiving data from an output module of the mobile device.

12. The method of claim 1, wherein determining the current workload of the mobile device further includes determining whether the current workload of the computing device is reduced by executing the instance of the background thread on the server.

13. A method for executing a photo application at a server, the method comprising:

receiving a request from a mobile device to provide information regarding an access to an instance of a background component of the photo application, the background component of the photo application including information to enable the server to run an instance of a background thread, the background thread performing a photo processing task of a given photo;

receiving the instance of the background component of the photo application from the mobile device when the server does not have access to the instance of the background component;

receiving a photo to be processed by executing the background thread at the server;

processing the photo by executing the instance of the background thread at the server, wherein an instance of the photo application executing at the mobile device includes another instance of the background thread and an instance of a foreground thread, the foreground thread of the photo application providing a user interface to access a processed image through the mobile device, wherein the processing of the photo by another instance of the background thread executing at the mobile device is stopped before the processing the photo at the server; and transmitting the processed photo and other related data to the mobile device, wherein the foreground thread executing at the mobile device provides access to the processed photo through the mobile device using the user interface generated by the foreground thread.

14. The method of claim 13, further comprising:

receiving, from the mobile device, an instruction to stop executing the instance of the background thread at the server, the instruction being sent my mobile device when an optimization factor is less than a predefined threshold value, wherein the optimization factor depends on a CPU resource, a GPU resource, a memory resource, a power, a data input/output amount, or a completion time needed for the instance of the background thread to continue executing at the server.

15. The method of claim 14, further comprising:

transmitting, from the server, data generated by the instance of the background thread executing at the server before the instance of the background thread is stopped.

16. The method of claim 13, wherein the photo processing being performed on a given photo by the background thread includes resizing, filtering, exposure adjusting, color adjusting, file format changing or editing.

17. The method of claim 13, wherein a given background thread includes a CPU intensive task, a GPU intensive task, a memory intensive task, a power intensive task, or a data input/output intensive task.

18. The method of claim 13, wherein the foreground thread is notified of the transmitted processed photo via an inter-thread communication as if an instance of the background thread executed at the mobile device initiated the inter-thread communication.

19. A mobile device comprising:

a processor;

a memory storing instructions which, when executed by the processor, cause the electronic device to perform a process including:

monitoring a photo application executing at the mobile device to identify a background thread and a foreground thread of the photo application, the background thread performing a photo processing task of a given photo, the foreground thread of the photo application providing a user interface to access a processed image through the mobile device, wherein the background thread does not directly interact with a user of the mobile device;

receiving a photo for processing and displaying using the photo application;

determining a current workload of the mobile device;

transmitting, from the mobile device to a server, the received photo and an instance of a background component of the photo application when the determined current workload exceeds a predefined threshold, the background component of the photo application including information to enable the server to run an instance of the background thread, the instance of the background component of the photo application being transferred when the server does not have a pre-existing instance of the background component;

receiving a processed photo from the server, wherein the processing of the photo is performed by executing the background thread at the server; and providing access to the processed photo through the mobile device using the user interface generated by the foreground thread of the photo application, wherein the foreground thread utilizes the processed photo to provide access through the user interface as if the processed photo was generated by an instance of the background thread executed at the mobile device.

20. The mobile device of claim 19, wherein transmitting, from the mobile device to the server, the received photo and the instance of the background component of the photo application further comprises:

stopping executing of the background thread at the mobile device;

transmitting, from the mobile device to the server, the received and other data on which the mobile device has been operating.

21. The mobile device of claim 19, wherein the photo processing being performed on the given photo by the background thread includes resizing, filtering, exposure adjusting, color adjusting, file format changing or editing.

22. The mobile device of claim 19, wherein a given background thread includes a CPU intensive task, a GPU intensive task, a memory intensive task, a power intensive task, or a data input/output intensive task.

23. The mobile device of claim 19, further comprising:

determining an optimization factor for the background thread of the photo application executing at the server;

if the optimization factor is less than a predefined threshold value, sending, from the mobile device to the server, an instruction to stop executing the instance of the background thread at the server;

executing the background thread of the photo application at the computing device.

24. The mobile device of claim 23, further comprising:

retrieving, from the server, data generated by the instance of the background thread executing at the server before the instance of the background thread is stopped.

25. The mobile device of claim 23, wherein the optimization factor depends on a CPU resource, a GPU resource, a memory resource, a power, a data input/output amount, or a completion time needed for the instance of the background thread to continue executing at the server.

* * * * *